(12) United States Patent
Kuno (10) Patent No.: US 8,587,749 B2
(45) Date of Patent: Nov. 19, 2013

(54) LIQUID CRYSTAL DISPLAY DEVICE FOR VEHICLE USE HAVING A SCREEN WITH A POLARIZATION MEMBER

(75) Inventor: Satoru Kuno, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 552 days.

(21) Appl. No.: 12/327,994

(22) Filed: Dec. 4, 2008

(65) Prior Publication Data

US 2009/0174847 A1 Jul. 9, 2009

(30) Foreign Application Priority Data

Jan. 9, 2008 (JP) ................................ 2008-001963

(51) Int. Cl.
*G02F 1/1335* (2006.01)
*G02F 1/1333* (2006.01)

(52) U.S. Cl.
USPC ................................ 349/96; 349/58; 359/609

(58) Field of Classification Search
USPC ................................ 349/96, 58; 359/609, 893
See application file for complete search history.

(56) References Cited

U.S. PATENT DOCUMENTS

| | | | |
|---|---|---|---|
| 7,142,980 B1 * | 11/2006 | Laverick et al. ............... | 701/491 |
| 2002/0054440 A1 | 5/2002 | Akamine et al. | |
| 2003/0016316 A1 * | 1/2003 | Sahouani et al. ............... | 349/96 |
| 2003/0071938 A1 * | 4/2003 | Hamamoto et al. ............ | 349/96 |
| 2004/0041504 A1 * | 3/2004 | Ozolins et al. ................ | 313/110 |
| 2007/0176797 A1 * | 8/2007 | Rhodes et al. ........... | 340/995.15 |
| 2008/0068520 A1 | 3/2008 | Minikey, Jr. et al. | |

FOREIGN PATENT DOCUMENTS

| | | |
|---|---|---|
| JP | 63-107421 | 7/1988 |
| JP | 3-62389 | 6/1991 |
| JP | 2001-331132 A | 11/2001 |
| JP | 2004-184838 | 7/2004 |
| JP | 2007-238005 A | 9/2007 |
| JP | 2009-145759 | 7/2009 |
| WO | 2007/103573 | 9/2007 |

OTHER PUBLICATIONS

Japan Office action, dated Mar. 6, 2012 along with an english translation thereof.
English language Abstract of JP 2007-238005 A, Sep. 20, 2007.
English language Abstract of JP 2001-331132 A, Nov. 30, 2001.

* cited by examiner

*Primary Examiner* — Michael Caley
(74) *Attorney, Agent, or Firm* — Greenblum & Bernstein, P.L.C.

(57) ABSTRACT

The present invention can include a display device for use in a vehicle having a screen with a polarizing member disposed in the front of a display surface of a liquid crystal display, the polarizing member having a light transmittance of less than 50%, a surface of the screen is coplanar with a surface of the cover member. Also, the polarizing member is not provided on the display surface of the liquid crystal display, and when the liquid crystal display is not used, the screen is inconspicuous, and when the liquid crystal display is used, information can be viewed from the screen.

11 Claims, 5 Drawing Sheets

LIQUID CRYSTAL DISPLAY DEVICE FOR VEHICLE USE HAVING A SCREEN WITH A POLARIZATION MEMBER

This application claims priority to Japanese patent application serial number 2008-1963, the contents of which are incorporated herein by reference.

BACKGROUND OF THE INVENTION

1. Field of the Invention

The present invention relates to a liquid crystal display device for vehicle use, the device having a liquid crystal display and a cover member covering the periphery of the liquid crystal display. When the liquid crystal display is not used, a screen disposed in the front of a display surface of the liquid crystal display can be made inconspicuous.

2. Description of the Related Art

Recently, a liquid crystal display device has been proposed for an instrument panel, vehicle seat or the like. On a liquid crystal display assembled in the instrument panel, map information of a car navigation system, an audio operation picture, DVD pictures and the like are displayed. In the case of a liquid crystal display assembled in the vehicle seat, the liquid crystal display is situated at a rear face side of a seatback or a headrest, and the pictures and the like can be enjoyed from a rear seat. For example, a liquid crystal display device for vehicle seat, as shown in JP-A-2007-238005. And, a liquid crystal display device for instrument panel, as shown in JP-A-2001-331132.

The liquid crystal display device of JP-A-2007-238005 uses a typical liquid crystal display having a display surface attached with polarization means including a polarizing film or polarizing plate. The display surface attached with the polarization means is exposed to the outside. In this case, a cover member is set such that it covers a display frame. Therefore, a difference in level is formed between the cover member and the liquid crystal display, and therefore the display surface is by one step from a surface of the cover member. Therefore, particularly when the liquid crystal display is not used, the device lacks in physical integration feeling between the display surface of the liquid crystal display and the cover member enclosing the display surface, leading to a problem in design quality. As a solution of this, a screen disposed in the same level as the cover member is considered to be used. However, in this case, the screen is further required to have color integration with the cover member. Consequently, if a transparent screen is merely used, since the internal liquid crystal display can be viewed from the outside through the screen when it is not used, a problem remains in color integration feeling.

On the other hand, in the liquid crystal display device of JP-A-2001-331132, polarization means is attached on a display surface, in addition, a screen is disposed in the front of the display surface. When the device is not used, the screen is inconspicuous and has an integrated feeling with peripheral members, and when it is used, various kinds of information can be viewed through the screen. The screen is made such that a smoke sheet is attached on a surface of a diffuser sheet, and a woodgrain pattern having many micropores that can transmit display light is formed on a surface of the smoke sheet. When the liquid crystal display is not used, the smoke sheet shades part of light from the outside, and therefore the inside of the device cannot be viewed through the screen. In addition, the same woodgrain pattern as that of the instrument panel is formed on the smoke sheet, so that an integrated feeling with the instrument panel is improved. When the liquid crystal display is used, a displayed image is viewed through the smoke sheet and the micropores of the woodgrain pattern. However, level equalization between the screen and the instrument panel is not particularly considered, and therefore lack of a physically integrated feeling is a concern. Moreover, since an image needs to be displayed through the smoke member in addition to the polarization means, luminance of a backlight of the liquid crystal display has to be increased compared with that in a usual case. Moreover, while the polarizing film or the like is typically subjected to antireflection processing, the screen still needs to be subjected to antireflection processing in order to display a clear image, causing a problem in cost. That is, since the liquid crystal display device uses a separated member (screen) from the polarization means, the device has a problem that the smoke member needs to be used, or a problem that additional processing is needed.

Thus, there is a need in the art for a liquid crystal display device for vehicle use, wherein even if the quantity of light is not increased, or additional processing is not performed, difference in level from the periphery is not found, and color integration feeling with the periphery is given, leading to high design quality.

BRIEF SUMMARY OF THE INVENTION

The present invention can include a display device for use in a vehicle having a screen with a polarizing member disposed in the front of a display surface of a liquid crystal display, the polarizing member having a light transmittance of less than 50%, a surface of the screen is coplanar with a surface of the cover member. Also, the polarizing member is not provided on the display surface of the liquid crystal display, and when the liquid crystal display is not used, the screen is inconspicuous, and when the liquid crystal display is used, information can be viewed from the screen.

DETAILED DESCRIPTION OF THE INVENTION (Embodiment 1)

Embodiment 1 shows an example of how the invention is applied to a liquid crystal display device in a vehicle seat. The embodiment 1 shows an example that the invention is applied to a liquid crystal display described in JP-A-2007-238005 that was previously proposed by the applicant. However, a basic configuration of a liquid crystal display device body is not particularly limited, and the invention can be applied to existing devices having various mechanisms. In the following description of embodiment 1, "front face" means a face in a vehicle front side, and "rear face" means a face in a vehicle rear side. When "surface" is used for a component such as a headrest 20 or a liquid crystal display device body 30, it means a face at which such a component exhibits its function while being assembled, and when "back" is used for the component, it means a face opposite to the "surface". That is, a surface of the headrest 20 is situated at headrest pad 21 side, and a surface of the liquid crystal display device body 30 is situated at an image display surface side. In the embodiment 1, the liquid crystal display device 30 is placed in a manner that a display surface of the device 30 is directed to a vehicle rear side. Therefore, for the liquid crystal display device body 30, "surface" refers to a face at a vehicle rear side, and "back" refers to a face at a vehicle front side. Moreover, in FIG. 1, only the screen 31 is colored to clearly show a state of a screen 31.

Figure 1:
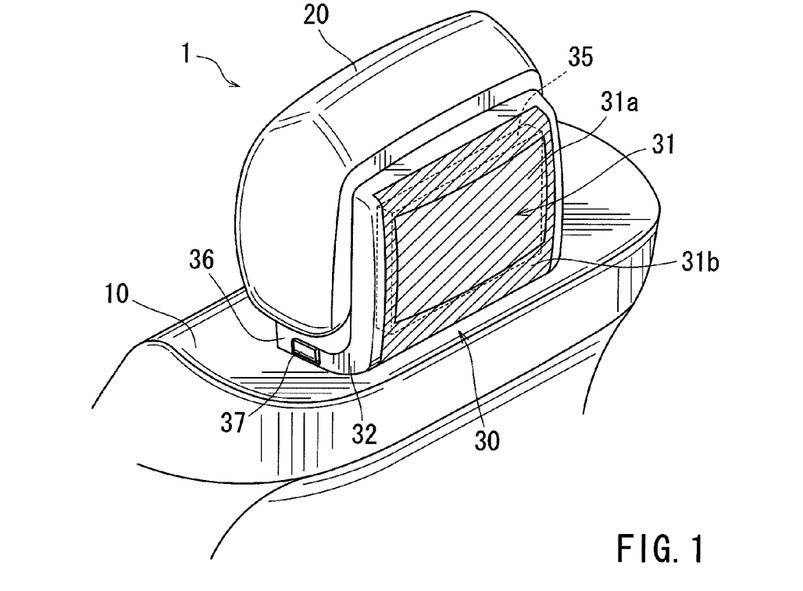
FIG. 1 shows a rear perspective view of a vehicle seat showing a nonuse state of a liquid crystal display device of embodiment 1.
Figure 3:
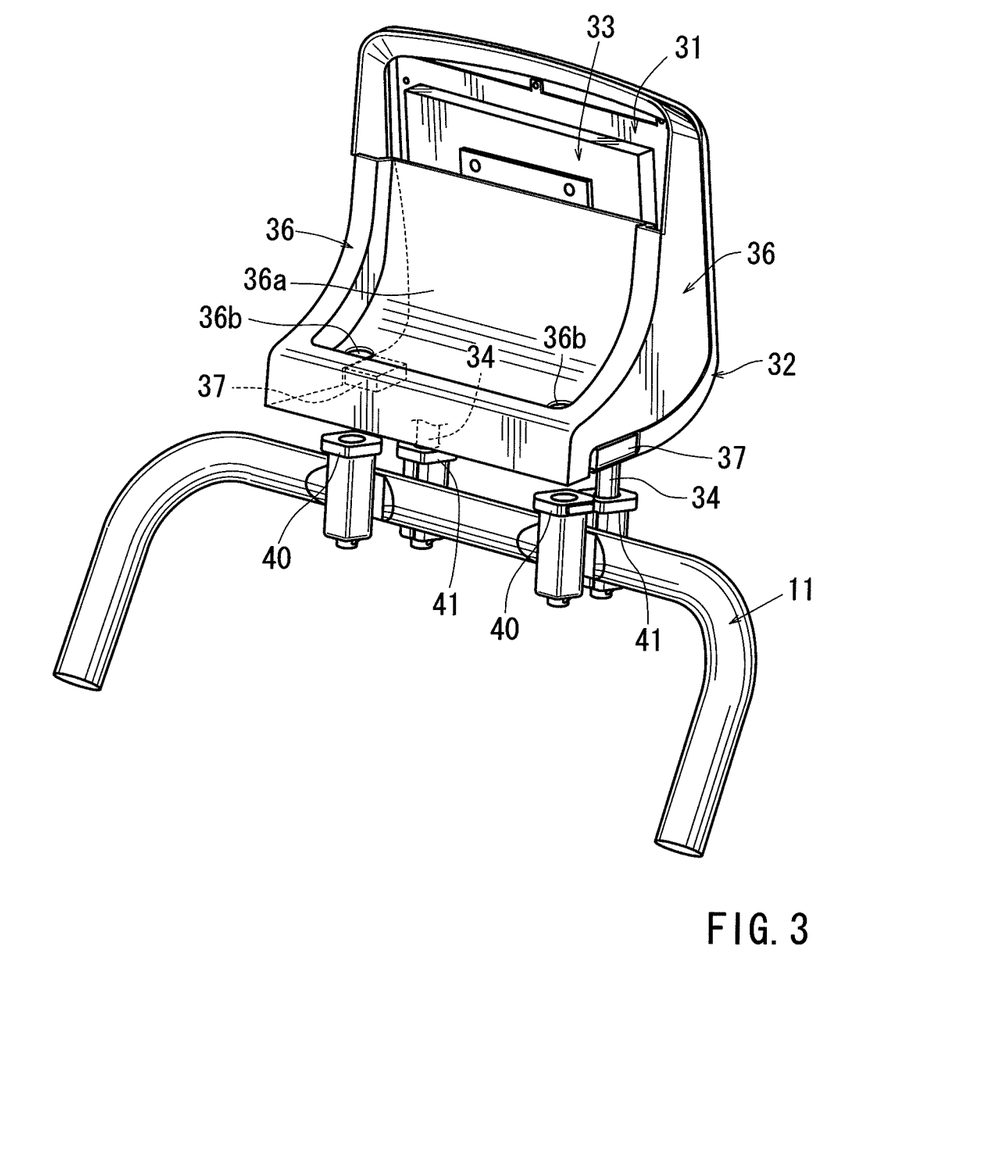
FIG. 3 shows a back perspective view of the liquid crystal display device in a condition where a headrest is removed from the vehicle seat.
Figure 4:
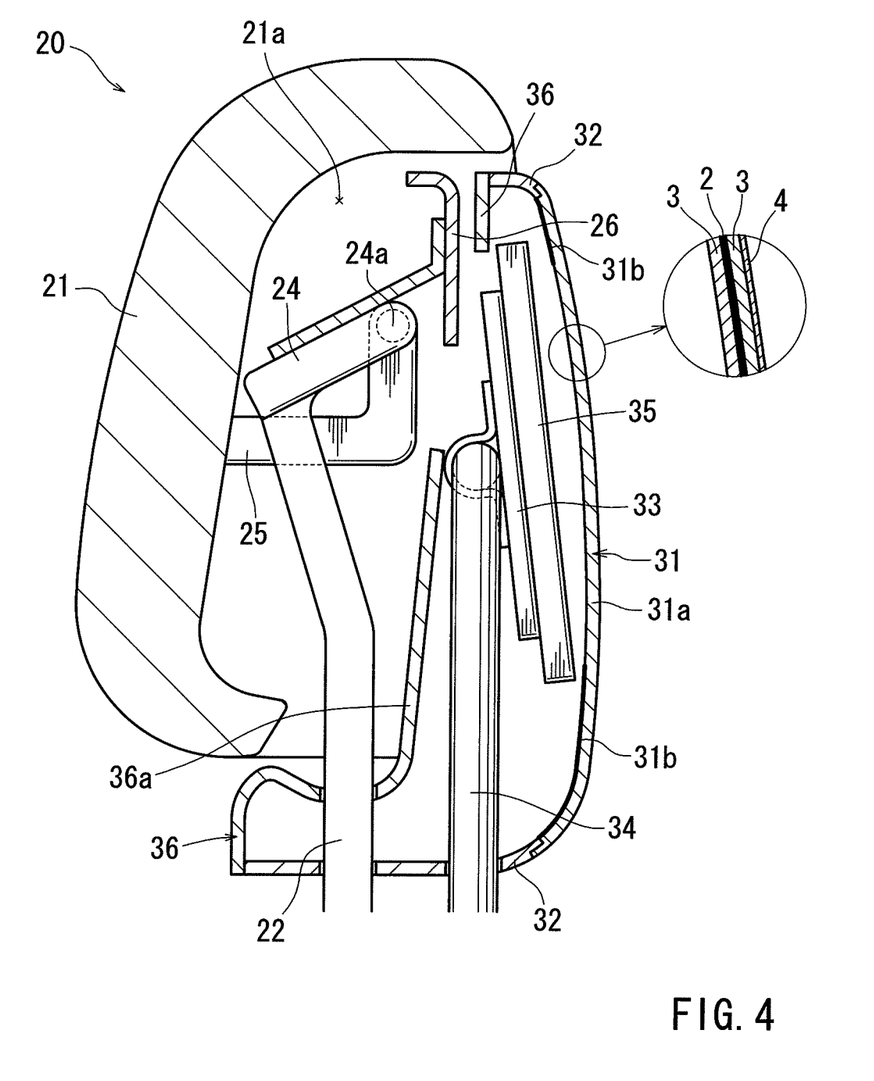
FIG. 4 shows a longitudinal side view of the liquid crystal display device and the headrest.

As shown in FIG. 1, a vehicle seat 1 is made such that the liquid crystal display device 30 is placed on a top of the seatback 10. The liquid crystal display device 30 is disposed at a position on a back of the headrest 20 that is on the top of the seatback 10 as well. The liquid crystal display device body 30 is placed in a manner that an image display surface of the device body is directed to a vehicle rear side, so that various images can be appreciated from a rear seat (not shown). As shown in FIG. 3 or 4, the headrest 20 and the liquid crystal display device body 30 are mounted on a back frame 11 forming a framework of the seatback 10.

As shown in FIG. 4, the headrest 20 has a headrest pad 21, stays 22, support tools 24, an attachment tool 25, and a back cover plate 26. The headrest pad 21 has a buffer structure, and receives and supports the back of the head of a passenger. A back portion of the headrest pad 21 is shaped to be hollowed at a lower side. Such a hollowing portion forms an accommodation space 21a for accommodating the liquid crystal display device 30. Two stays 22 are provided at either side, and an upper end portion of each stay is connected to each support tool 24. Thus, the stays 22 and the support tools 24 are assembled as an integrated component generally having a circular shape. For the stays 22, the support tools 24 are mounted on the back portion of the headrest pad 21. The stays 22 are assembled in a manner of extending two rod members from the headrest pad 21. The stays 22 are inserted into two supports 40 on either side placed on an upper part of the back frame 11 respectively, thereby the headrest 20 is vertically movably mounted on the seatback 10 and supported by the seatback.

Each support tool 24 is mounted on the headrest pad 21 via the attachment tool 25. The attachment tool 25 is connected to a hinge 24a of the support tool 24 in a pivotable manner around the hinge. The attachment tool 25 is integrally attached to the back portion of the headrest pad 21. Thus, the headrest pad 21 is allowed to oscillate in a back and forth direction with respect to the stays 22 with the hinge 24a as a center. Even if the headrest 20 oscillates, a gap between the headrest 20 and the liquid crystal display device body 30 is continuously covered with the headrest 20. Thus, a mounting structure portion between the stays 22 and the headrest pad 21 is not viewed from the outside. The back cover 26 is mounted on the back portion of the headrest pad 21. The back cover 26 can be made of synthesized resin, and covers the mounting structure portion between the stays 22 and the headrest pad 21 from a rear face side. The back cover 26 has a curved plate shape extending in a direction from an upper end of the back portion of the headrest pad 21. Thus, even in a state where the headrest 20 is raised, the back cover 26 covers the mounting structure portion between the stays 22 and the headrest pad 21 from the rear face side so that the mounting structure portion is not seen through a gap formed in an upper side of the liquid crystal display device body 30.

Figure 2:
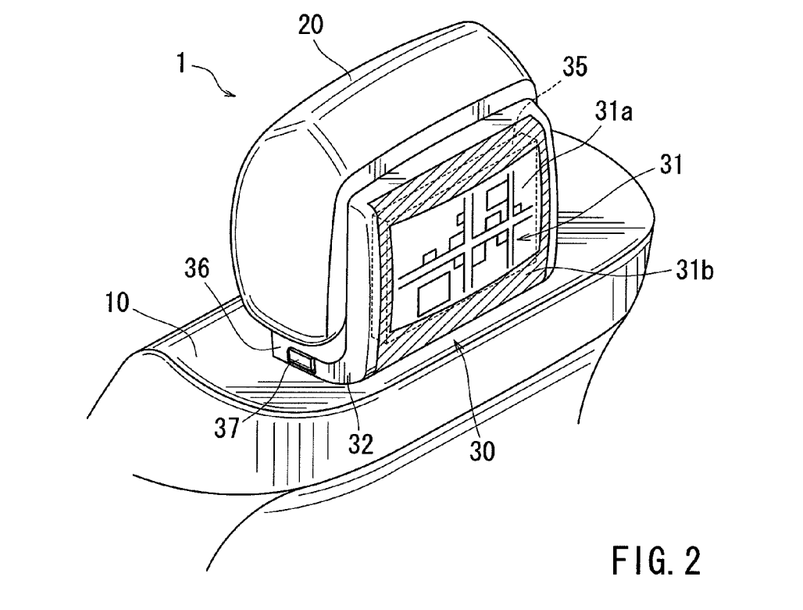
FIG. 2 shows a rear perspective view of a vehicle seat showing a use state of the liquid crystal display device of the embodiment 1.

As shown in FIGS. 1 to 3, the liquid crystal display device body 30 has a screen 31, a rear cover 32, a bracket 33, stays 34, a liquid crystal display 35, and a front cover 36. The liquid crystal display device body 30 can be generally colored black or gray. The rear cover 32 can be made of synthetic resin, and has a shape of a plate being folded into an L-shape. At a rising face side of the rear cover 32, an opening is formed, the opening having enough size to be fitted with the screen 31 so as to allow an image on the liquid crystal display 35 to be displayed to the outside. The rear cover 32 is assembled as a rear, outer frame of the liquid crystal display device body 30 in a manner of enclosing the liquid crystal display 35. The bracket 33 is screwed to a back (front face) of the liquid crystal display 35. The stays 34 are mounted on a back of the bracket 33. A polarizing film or a polarizer sheet is not necessary for the display surface of the liquid crystal display 35 (unlike in a previous mentioned case).

Upper end portions of the stays 34 are connected to the bracket 33 while also being pivotable in relation to the bracket. The bracket 33 is mounted on the liquid crystal display 35, thereby the stays 34 are assembled in a manner of extending two rod members from the liquid crystal display device body 30. Each stay 34 forms a leg for mounting the liquid crystal display device body 30. The stays 34 are inserted into two supports 41 placed on an upper part of the back frame 11 respectively, thereby the liquid crystal display device body 30 is placed on the seatback 10.

The front cover 36 is mounted at a back (front face) side of the liquid crystal display 35. The front cover 36 can be made of synthetic resin, and fitted into the rear cover 32. A cover portion 36a is formed in the front cover 36, which covers a mounting structure portion between the stays 34 and the liquid crystal display 35 from a front face side. The cover portion 36a is shaped to rise in a shape of a curved surface from a lower part of the front cover 36 to an upper side. Thus, even in a condition where the headrest 20 is raised, the mounting structure portion between the stays 34 and the liquid crystal display 35 is hidden by the cover portion 36a such that it is not seen through a gap formed in a lower side of the headrest 20.

Through-holes 36b being vertically penetrated are formed at two points on either side near the front of the front cover 36. When the headrest 20 is placed on the seatback 10, each stay 22 of the headrest 20 is inserted through each of the through-holes 36b from an upper side. Each stay 22 is inserted through each of the through-holes 36b and then inserted into each support 40, thereby the headrest 20 can be placed at an upper side of the front cover 36 with the front cover as a base. The headrest 20 is placed in this way, thereby the liquid crystal display device body 30 can be accommodated into the accommodation space 21a formed in the back portion of the headrest 20 while being slid from a lower side. Thus, the headrest 20 and the liquid crystal display device body 30 can be assembled into a compact configuration having an integrated feeling. Moreover, by using the above configuration, the liquid crystal display device body 30 can be independently configured so that it does not follow movement in a vertical direction of the headrest 20. Therefore, it is unnecessary that wiring of the liquid crystal display 35 are established via the inside of the stays 22 to follow such movement, and consequently wiring into the seatback 10 can be simplified. Moreover, release buttons 37 are provided at lower positions on either side of the front cover 36. When the headrest 20 or the liquid crystal display device body 30 is removed from the seatback 10, it is removed while pressing the release buttons 37 on either side to the inside.

The screen 31 is a sheet-like member having a shape retaining property, and includes a so-called polarizer sheet. Specifically, as shown in FIG. 4, the polarizing film 2 is sandwiched by transparent protective layers (hard-coat layers) 3 from two sides, and an antireflective layer 4 is provided on a surface of the screen 31. An outer circumferential edge portion of the back of the screen 31 is subjected to anti-see-through processing. Thus, the screen 31 integrally has a display region 31a in a central portion, and an anti-see-through portion 31b enclosing the whole circumference of the display region 31a. When the liquid crystal display 35 is used, an image is displayed on the display region 31a. The polarizer sheet 31 has a light transmittance of less than 50%, and a smoke member is not used.

As shown in FIGS. 1 and 4, the screen 31 has a larger area as compared with the display surface of the liquid crystal display 35. The screen 31 is joined to a surface of the rear cover 32 such that the screen entirely covers the opening of the rear cover 32. The display surface of the liquid crystal display 35 is also covered with the screen 31. In this condition, a surface of the screen 31 and the surface of the rear cover 32 are in the same level or include coplanar surfaces. The screen 31 is formed in a three-dimensionally curved shape in which the center of the screen is curved to a surface side in accordance with a streamline of the rear cover 32. Since the screen 31 is formed in the three-dimensionally curved shape, a gap having a predetermined size is formed between the screen 31 and the liquid crystal display 35. The screen 31 has a function of the polarizer sheet.

The screen 31 or the polarizer sheet has a structure formed in the following way: iodine, dye or the like is adsorbed to a base of polymer such as polyvinyl alcohol (PVA), polyvinyl formal, and polyvinyl acetal, then the polymer base is stretched and oriented in a certain direction so that a polarizing film 2 is formed. Then either side of the polarizing film is attached with the protective layer 3 including an optically transparent material such as triacetylcellulose, acetylcellulose, acetylbutylcellulose, polyethylene terephthalate (PET), polycarbonate (PC), polysulfone (PSF), and polyarylate (PAR), and thus the polarizing film is integrated with the protective layer. The polarizing film 2 can be mixed with a fluorescent brightener, a dispersant, a heat stabilizer, a light stabilizer, an ultraviolet absorbent, an antistatic agent, an antioxidant, a lubricant or the like as needed. The base film of the polarizing film 2 can be molded by a cast molding method, an extrusion molding method, an inflation molding method and the like. Thickness of the polarizing film 2 can be about 5 μm to 1 mm the film may be stretched by uniaxial stretching or biaxial stretching. The protective layer 3 can be formed by lamination or adhesion of a protective film, in addition, by coating of a protective layer material.

Antireflection processing is performed to a surface of the protective layer 3 of such a polarizer sheet, that is, an antireflection layer 4 is formed on the surface. As the antireflection layer 4, AR (Anti Reflection) coating can be used. For the AR coating, a material having a low refractive coefficient compared with the polarizer sheet is thinly coated in a thickness corresponding to a quarter of wavelength λ of light. Thus, light injected into the AR coating (antireflection layer 4) collides with surface-reflected light between the AR coating and the polarizer sheet in an exactly opposite phase, so that the reflected light is cancelled and thus becomes invisible, which is a principle of the antireflection. Since such an antireflection effect depends on a wavelength ($\frac{1}{4}\lambda$), the effect is shown only to light having a particular wavelength. Therefore, to meet all wavelengths in a visible region, multiple layers of AR coatings are preferably formed using materials having different refractive coefficients. In the case of a liquid crystal, if a nonreflective condition is intentionally made in a region from green to blue, which is a most obstructive region to human eyes, a considerably large effect is obtained. Thus, in consideration of cost, only a single layer of AR coating, being effective for light in the region from green to blue, can be satisfactorily formed. As the antireflection processing, a wire grid structure is given in addition to the AR coating, in which a plurality of linear structures are provided in a manner of being arranged in parallel while being separated from one another. By using such a wire grid structure, linearly polarized light of reflected light is reflected, which oscillates in a direction parallel to a longitudinal direction of the linear structures, and linearly polarized light of the reflected light is transmitted, which oscillates in a direction perpendicular to the longitudinal direction of the linear structures. Therefore, reflected light is injected again, thereby use efficiency of light can be improved, and reflection or projection of light from the outside can be eliminated. In this case, the antireflection layer 4 can be formed by adsorbing metal, such as silver, aluminum, chromium, indium, iridium, magnesium, palladium, platinum, rhodium, ruthenium, antimony and tin, on the surface of the protective layer by a physical vapor deposition method (PVD), a chemical vapor deposition method (CVD), a sputtering method, an electron beam lithography method, and the like, or formed by printing resin dispersed with the metal by screen printing and the like. As a different method of the antireflection processing, a scattering film containing fine particles in its surface is formed as a light scattering layer. In the case of forming the film as the light scattering layer, the layer typically includes the same coating material as a material of the protective layer, the coating material being dispersed with inorganic or organic, fine particles having a diameter of 1 to 50 μm.

The anti-see-through portion 31b is formed to prevent reduction in design quality due to a fact that when the liquid crystal display 35 is used, the inside of the liquid crystal display device body 30 is seen through from the periphery of the display region 31a. Therefore, the anti-see-through portion 31b is preferably formed such that it exactly encloses the liquid crystal display 35. In other words, the anti-see-through portion 31b is preferably formed such that area of the display region 31a in the central portion enclosed by the anti-see-through portion 31b is approximately the same as area of the display surface of the liquid crystal display 35. The anti-see-through portion 31b is formed by printing, coating, or spraying a black material such as a pigment, which has substantially no light transmittance, or has an extremely low light transmittance, on a back of the screen 31, or by attaching an anti-see-through film or the like on the back. Finally, the polarizer sheet is formed to have the three-dimensional shape in accordance with the streamline of the rear cover 32 by vacuum molding or press molding, and consequently the screen 31 is obtained.

In this way, each of the polarizing film 2, protective layer 3, and antireflection layer 4 are formed by a typical molding method. Thus, light transmittance of the screen 31 is controlled to be less than 50%. Since light transmittance of the screen 31 is less than 50%, an opposite side is difficult to be seen through the screen 31 unless a light source exists behind the screen 31. In this way, the polarizer sheet is used as the screen 31, and disposed on the front face of the liquid crystal display device body 30. Thus, as shown in FIG. 1, when the liquid crystal display 35 is not used, since a light source does not exist in the inside of the liquid crystal display device body 30 (and therefore the inside is dark), the screen 31 looks dark. Thus, when the liquid crystal display 35 is not used, a color tone of the screen 31 is similar to a color tone of the rear cover 32, which gives color integration feeling, leading to improvement in design quality.

On the other hand, when the liquid crystal display 35 is used, an image or the like is displayed on the display surface of the liquid crystal display. Thus, the image displayed on the display surface acts as a light source, and as shown in FIG. 2, the image can be viewed from the display region 31a via the polarizing film 2 of the screen 31. In addition, the image is clearly displayed due to existence of the antireflection layer 4. Since a portion of the screen at an outer circumferential edge side with respect to the liquid crystal display 35 is formed as the anti-see-through portion 31b, unnecessary portions within the liquid crystal display device 30 are not seen through the portion of the screen.

(Embodiment 2)

Figure 5:
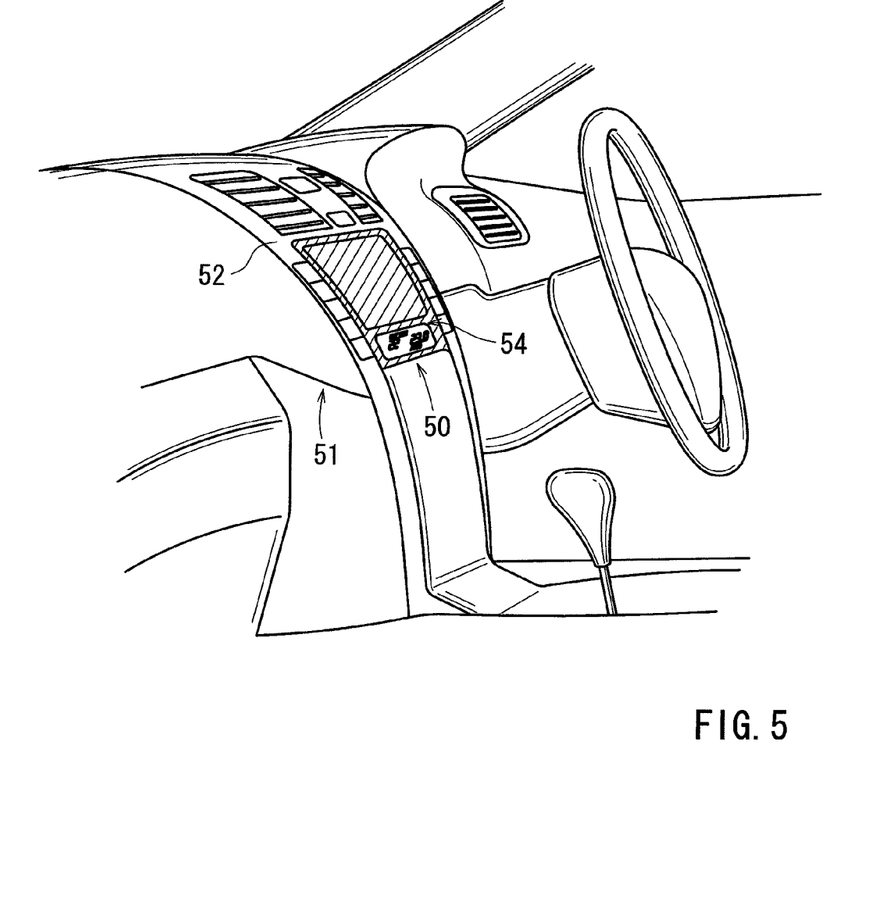
FIG. 5 shows a perspective view of a vehicle instrument panel assembled with a liquid crystal display device of embodiment 2.
Figure 6:
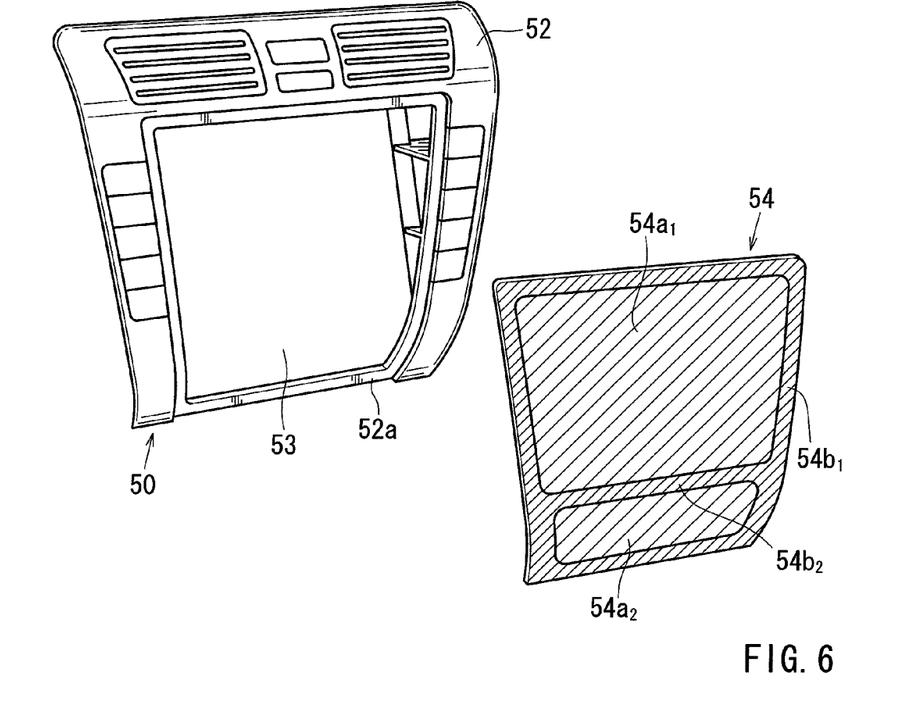
FIG. 6 shows an exploded perspective view of the liquid crystal display device of the embodiment 2.

In FIGS. 5 and 6, only a screen 54 is colored to clearly show a state of a screen 54.

As shown in FIG. 5, a liquid crystal display device 50 of embodiment 2 is assembled in a vehicle instrument panel 51. As shown in FIG. 6, a liquid crystal display 53 is held at a rear of an operation panel portion 52 of the instrument panel 51 and fixed to the operation panel portion. The screen 54 is fitted in a central portion of the operation panel portion 52. In the central portion of the operation panel portion 52, an opening is formed, the opening having enough size to allow an image on the liquid crystal display 53 to be displayed to the outside. In the periphery of the opening of the operation panel portion 52, an attachment margin 52a for adhering the screen 54 is integrally formed. The attachment margin 52a is recessed by one step to the rear from a surface of the operation panel portion 52. The screen 54 is adhered to the attachment margin 52a. As shown in FIG. 5, in a condition that the screen 54 is adhered to the operation panel portion 52, the surface of the operation panel portion 52 is in the same level as a surface of the screen 54. The screen 54 is formed in a three-dimensionally curved shape in accordance with a streamline of the operation panel portion 52.

Figure 7:
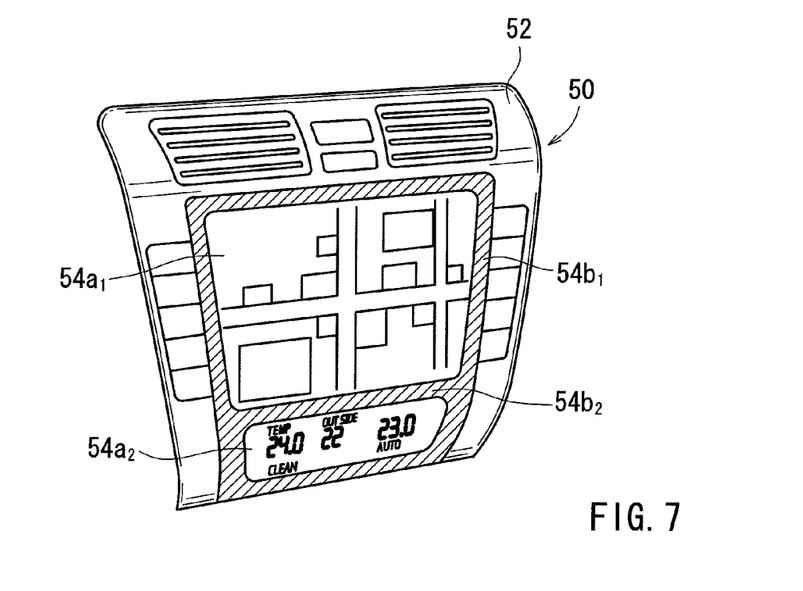
FIG. 7 shows a perspective view of the liquid crystal display device in a use state.

While not shown in detail, as the screen 54, a screen is used, which is formed by laminating a polarizing film having a light transmittance of less than 50% on a transparent sheet including an optically transparent material such as triacetylcellulose, acetylcellulose, acetylbutylcellulose, polyethylene terephthalate (PET), polycarbonate (PC), polysulfone (PSF), or polyarylate (PAR). In addition, a surface of the screen is subjected to antireflection processing such as AR coating. Since the screen 54 still has a light transmittance of less than 50%, when the liquid crystal display 53 is not used, the screen 54 is dark, which gives color integration feeling with the operation panel portion 52 (refer to FIG. 6). On the other hand, when the liquid crystal display 53 is used, as shown in FIG. 7, a picture or the like can be viewed via the screen 54.

DVD pictures and car navigation information are displayed on the liquid crystal display 53, in addition, various kinds of character information such as room temperature, air conditioner setting temperature, and time are displayed thereon. Thus, in the embodiment 2, a display region is divided into a display region 54$a_1$ for picture display, and display regions 54$a_2$ for character information display. Specifically, an anti-see-through portion 54$b_1$ is formed in an outer circumferential edge portion of a back of the screen 54 as in the embodiment 1, in addition, an anti-see-through portion 54$b_2$ is formed in a horizontal direction at a vertically lower part. The adhesion margin 52a of the operation panel portion 52 is not seen by the anti-see-through portion 54$b_1$ in the outer circumferential edge portion. Moreover, the display region is divided into the display region 54$a_1$ for picture display and the display regions 54$a_2$ for character information display by the anti-see-through portion 54$b_2$ in the horizontal direction. The anti-see-through portion 54$b_2$ in the horizontal direction is not necessarily required. However, by using this, various images and character information do not adversely affect each other, leading to improvement in quality of the liquid crystal display device 50.

This invention claims:

1. A liquid crystal display device for vehicle use, which is mounted in place in a vehicle room, comprising:
   a liquid crystal display; and
   front and rear covers covering a periphery of the liquid crystal display, wherein
   a screen having a polarizer is disposed in front of a display surface of and extending beyond an upper display-side outer edge portion and a lower display-side outer edge portion of the liquid crystal display, the polarizer having a light transmittance of less than 50%,
   a surface of the screen is coplanar with a surface of the rear cover such that the rear cover encloses and partially joins the screen, the polarizer is not provided on the display surface of the liquid crystal display,
   an anti-see-through portion is disposed at an outer circumferential edge portion on an inner back side of the screen facing the liquid crystal display such that an inner edge of the anti-see-through portion overlaps the upper and lower display side outer edge portions of the liquid crystal display,
   a distance between the upper display-side outer edge portion of the liquid crystal display and the screen is greater than a distance between the lower display-side outer edge portion of the liquid crystal display and the screen; and
   when the liquid crystal display is not used, the screen is inconspicuous, and when the liquid crystal display is used, various kinds of display information can be viewed via the screen.

2. The liquid crystal display device for vehicle use according to claim 1, wherein the screen is a sheet-like member having a shape retaining property and has a deflection function.

3. The liquid crystal display device for vehicle use according to claim 1, wherein the screen has transparent protective layers disposed on two sides of a polarizing film and an antireflective layer at a surface side of the screen.

4. The liquid crystal display device for vehicle use according to claim 1, wherein the screen is formed in one of a two-dimensionally curved shape and a three-dimensionally curved shape in accordance with a surface profile of the rear cover.

5. The liquid crystal display device for vehicle use according to claim 1, wherein the screen has an integral display region in a central portion, and the anti-see-through portion encloses a whole circumference of the display region.

6. The liquid crystal display device for vehicle use according to claim 5, wherein an area of the display region is approximately the same as an area of the display surface of the liquid crystal display.

7. The liquid crystal display device for vehicle use according to claim 6, wherein the anti-see-through portion is provided so as to extend in a horizontal direction at a vertically lower part of the screen, and the display region is divided into a display region for picture display and a display region for character information display.

8. The liquid crystal display device for vehicle use according to claim 1, wherein the screen has a curved surface that extends to first and second portions of the rear cover.

9. The liquid crystal display device for vehicle use according to claim 1, wherein the screen is a three-dimensionally curved shape in which the center of the screen is curved to a surface side in accordance with a streamline of the rear cover.

10. The liquid crystal display device for vehicle use according to claim 1, wherein an antireflection layer is provided on the surface of the screen.

11. The liquid crystal display device for vehicle use according to claim 1, wherein the anti-see-through portion is provided to enclose the liquid crystal display.

\* \* \* \* \*